United States Patent
Noble

(10) Patent No.: US 12,198,312 B2
(45) Date of Patent: Jan. 14, 2025

(54) HIGH FRAME RATE IMAGE PRE-PROCESSING SYSTEM AND METHOD

(71) Applicant: SEEING MACHINES LIMITED, Australian Capital Territory (AU)

(72) Inventor: John Noble, Australian Capital Territory (AU)

(73) Assignee: SEEING MACHINES LIMITED, Australian Capital Territory (AU)

( * ) Notice: Subject to any disclaimer, the term of this patent is extended or adjusted under 35 U.S.C. 154(b) by 562 days.

(21) Appl. No.: 17/253,006

(22) PCT Filed: Jun. 17, 2019

(86) PCT No.: PCT/AU2019/050620
§ 371 (c)(1),
(2) Date: Dec. 16, 2020

(87) PCT Pub. No.: WO2019/241834
PCT Pub. Date: Dec. 26, 2019

(65) Prior Publication Data
US 2021/0118108 A1    Apr. 22, 2021

(30) Foreign Application Priority Data
Jun. 18, 2018  (AU) ................. 2018902161

(51) Int. Cl.
*G06V 10/00*    (2022.01)
*B60R 21/015*   (2006.01)
(Continued)

(52) U.S. Cl.
CPC .......... *G06T 5/90* (2024.01); *B60R 21/01538* (2014.10); *B60R 21/01552* (2014.10);
(Continued)

(58) Field of Classification Search
CPC ...... G06V 40/18; G06V 40/19; G06V 40/193; G06V 10/141; G06V 10/25; G06V 10/44;
(Continued)

(56) References Cited

U.S. PATENT DOCUMENTS

| 8,437,513 | B1 * | 5/2013 | Derakhshani | G06F 18/00 |
| | | | | 382/117 |
| 2005/0100191 | A1 * | 5/2005 | Harbach | A61B 5/163 |
| | | | | 382/104 |

(Continued)

FOREIGN PATENT DOCUMENTS

| JP | 2009033586 A | 2/2009 |
| JP | 2010161664 A | 7/2010 |

(Continued)

OTHER PUBLICATIONS

Langseth, R., "Implementation of a distributed real-time video panorama pipeline for creating high quality virtual views", (Jan. 1, 2014), pp. 1-145, Master's Thesis, URL: http://home.ifi.uio.no/paalh/students/RagnarLangseth.pdf, XP055664507.

*Primary Examiner* — Li Liu
(74) *Attorney, Agent, or Firm* — FisherBroyles, LLP; Jason P. Mueller

(57) ABSTRACT

Described herein is an image pre-processing system and method. One embodiment provides a method (500) including: at step (501), receiving a plurality of images captured at a first frame rate, the plurality of images captured under at least two different image conditions; pre-processing the plurality of images by: at step (502) identifying one or more regions of interest within the images; at step (503), performing a visibility measure on the one or more regions of interest; and, at step (504), selecting a subset of the plurality of images based on the visibility measure; and, at step (505), feeding the subset of images to an image processing pipeline (Continued)

for subsequent processing at a second frame rate that is lower than the first frame rate.

20 Claims, 8 Drawing Sheets

(51) Int. Cl.
  *G06T 5/90* (2024.01)
  *G06T 5/92* (2024.01)
  *G06V 10/141* (2022.01)
  *G06V 10/25* (2022.01)
  *G06V 20/59* (2022.01)
  *G06V 40/18* (2022.01)
  *H04N 23/71* (2023.01)
  *H04N 23/73* (2023.01)
  *H04N 23/741* (2023.01)
(52) U.S. Cl.
  CPC .............. *G06T 5/92* (2024.01); *G06V 10/141* (2022.01); *G06V 10/25* (2022.01); *G06V 20/59* (2022.01); *G06V 40/18* (2022.01); *H04N 23/71* (2023.01); *H04N 23/73* (2023.01); *H04N 23/741* (2023.01)

(58) Field of Classification Search
  CPC .................. G06V 10/993; G06V 20/59; G06T 2207/30041
  See application file for complete search history.

(56) References Cited

U.S. PATENT DOCUMENTS

| | | |
|---|---|---|
| 2008/0051957 A1 | 2/2008 | Breed |
| 2010/0118159 A1* | 5/2010 | Proca ..................... H04N 23/71 348/229.1 |
| 2013/0259322 A1* | 10/2013 | Lin ....................... G06V 10/993 382/117 |
| 2016/0117635 A1* | 4/2016 | Parker ................... H04N 23/62 705/28 |
| 2016/0364609 A1* | 12/2016 | Ivanisov ................ G06F 18/22 |
| 2017/0359494 A1 | 12/2017 | Zhou |
| 2018/0005057 A1 | 1/2018 | Lee |

FOREIGN PATENT DOCUMENTS

| | | |
|---|---|---|
| JP | 2011160320 A | 8/2011 |
| JP | 2013146104 A | 7/2013 |
| JP | 2017123997 A | 7/2017 |

\* cited by examiner

HIGH FRAME RATE IMAGE PRE-PROCESSING SYSTEM AND METHOD

FIELD OF THE INVENTION

The present invention relates to image processing and in particular to a system and method for pre-processing images of a video sequence to improve image quality. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Modern image sensors can accommodate high frame rate imaging at rates of up to several hundred Hertz. However, the efficient processing of such high frame rates requires an expensive image processing system, particularly when the images are to be processed in real-time. In general, the upper limit of image processing power increases with the cost and sophistication of the imaging system. Thus, processing images at high frame rates is typically prohibitive for low cost applications.

High Dynamic Range (HDR) imaging is a technique that has been developed to produce higher dynamic range images from less sophisticated imaging systems. A particular application of HDR is the capturing of a greater range of luminance levels to more accurately represent real-world scenes containing both bright and dark regions.

In HDR techniques, images of a scene are captured at different exposure times and the images are combined in a complex manner to maximise the range of luminance in the image. This requires complex image synthesising techniques which are computationally intense. In particular, in the HDR process, each image is separately processed to generate a synthetic higher quality image. As such, HDR techniques are difficult to perform on high frame rate image sequences without expensive equipment.

US Patent Application Publication 2008/069403 entitled Face Monitoring System and Method for Vehicular Occupants and assigned to Automotive Technologies International, Inc. relates to a face monitoring system for vehicle drivers. This document describes adjusting the exposure time of a camera across different pixel regions of an image when an image is formed by adding a sequence of very short exposures. However, like the HDR process, every image must be processed and the different exposures must be combined through an algorithm to form a single image. Thus, this processing is difficult to perform in real time without expensive processing equipment.

SUMMARY OF THE INVENTION

In accordance with a first aspect of the present invention there is provided an image pre-processing method including:
receiving a plurality of images captured at a first frame rate, the plurality of images captured under at least two different image conditions;
pre-processing the plurality of images by:
(a) identifying one or more regions of interest within the images;
(b) performing a visibility measure on the one or more regions of interest; and
(c) selecting a subset of the plurality of images based on the visibility measure; and
feeding the subset of images to an image processing pipeline for subsequent processing at a second frame rate that is lower than the first frame rate.

In some embodiments, the image conditions include an exposure time of an image. In some embodiments, the image conditions include selective illumination by one or more light sources. In some embodiments, the image conditions include a brightness level of the one or more light sources. The image conditions may also include image sensor binning to increase or decrease the image resolution. The image conditions may further include image sensor cropping to the one or more regions of interest. Finally, the image conditions may also include a focal length of camera imaging optics used to capture the images.

In some embodiments, the region of interest is the entire image.

In some embodiments, the step of identifying one or more regions of interest includes identifying one or more image features within individual images. The one or more regions of interest may include a subset of pixels around the identified image features.

In some embodiments, the step of performing a visibility measure includes detecting specular reflections within the one or more regions of interest. The detecting of specular reflections may include determining a position of specular reflections within the one or more regions of interest. The detecting of specular reflections may include identifying specular corneal reflections from an eye of a subject being imaged. The detecting of specular reflections may also include identifying specular reflections from eyewear being worn by a subject being imaged.

In some embodiments, the step of performing a visibility measure includes determining a number of specular reflections within the one or more regions of interest.

In some embodiments, the step of performing a visibility measure includes detecting a brightness level of the one or more regions of interest.

In some embodiments, the step of performing a visibility measure includes performing edge detection on the one or more regions of interest.

In some embodiments, the step of performing a visibility measure includes performing contrast detection on the one or more regions of interest.

In some embodiments, the step of performing a visibility measure includes detecting a level of glare within the one or more regions of interest.

In some embodiments, the step of performing a visibility measure includes detecting a level of image noise within the one or more regions of interest.

In some embodiments, the one or more image features may include a face of a subject being imaged. The one or more image features may further include facial features of a subject being imaged. For example, the one or more image features may include an eye of the subject imaged. In some embodiments, the one or more image features includes a portion of a vehicle steering wheel.

In some embodiments, the first frame rate is higher than an upper limit of the frame rate capable of being processed by the image processing pipeline.

In some embodiments, the image processing pipeline is a vehicle driver monitoring system. Preferably, the driver monitoring system is configured to track the face and/or eyes of a vehicle driver. The one or more regions of interest may be determined from an earlier detection of the position of the face and/or eyes of the vehicle driver by the driver monitoring system.

In some embodiments, the method includes the step of buffering the received plurality of images and distributing them into batches.

In accordance with a second aspect of the present invention there is provided an image capture and processing system including:
- a camera configured to capture a plurality of digital images of a scene at a first frame rate;
- one or more light sources configured to illuminate the scene during a period in which the digital images are captured;
- a controller configured to selectively control one or both of the camera shutter exposure period and/or the illumination time and power of the one or more light sources to vary image conditions under which each digital image is captured;
- a pre-processing system configured to:
  - receive the digital images at the first frame rate;
  - pre-process the digital images by:
    - (a) identifying one or more regions of interest within the images;
    - (b) performing a visibility measure on the one or more regions of interest; and
    - (c) selecting a subset of the plurality of images based on the visibility measure; and
  - feed the subset of the plurality of images to an image processing pipeline at a second frame rate that is lower than the first frame rate.

In accordance with a third aspect of the present invention there is provided an image pre-processing method including:
- capturing a plurality of images at a first frame rate, the plurality of images captured under at least two different image conditions;
- pre-processing the plurality of images by selecting a subset of the plurality of images based on a measure of visibility of one or more features identified in the images; and
- feeding the subset of the plurality of images to an image processing pipeline at a second frame rate that is lower than the first frame rate.

BRIEF DESCRIPTION OF THE DRAWINGS

Preferred embodiments of the disclosure will now be described, by way of example only, with reference to the accompanying drawings in which.

DETAILED DESCRIPTION

Described herein is an image processing system and method. The system/method will be described with reference to the specific application of driver monitoring systems. However, it will be appreciated that the invention has applications in broader context, particularly for applications involving the processing video sequences in real-time or near real-time. One possible candidate for the invention is a 3-D motion capture system such as an Xbox Kinect.

System Overview

Figure 1:
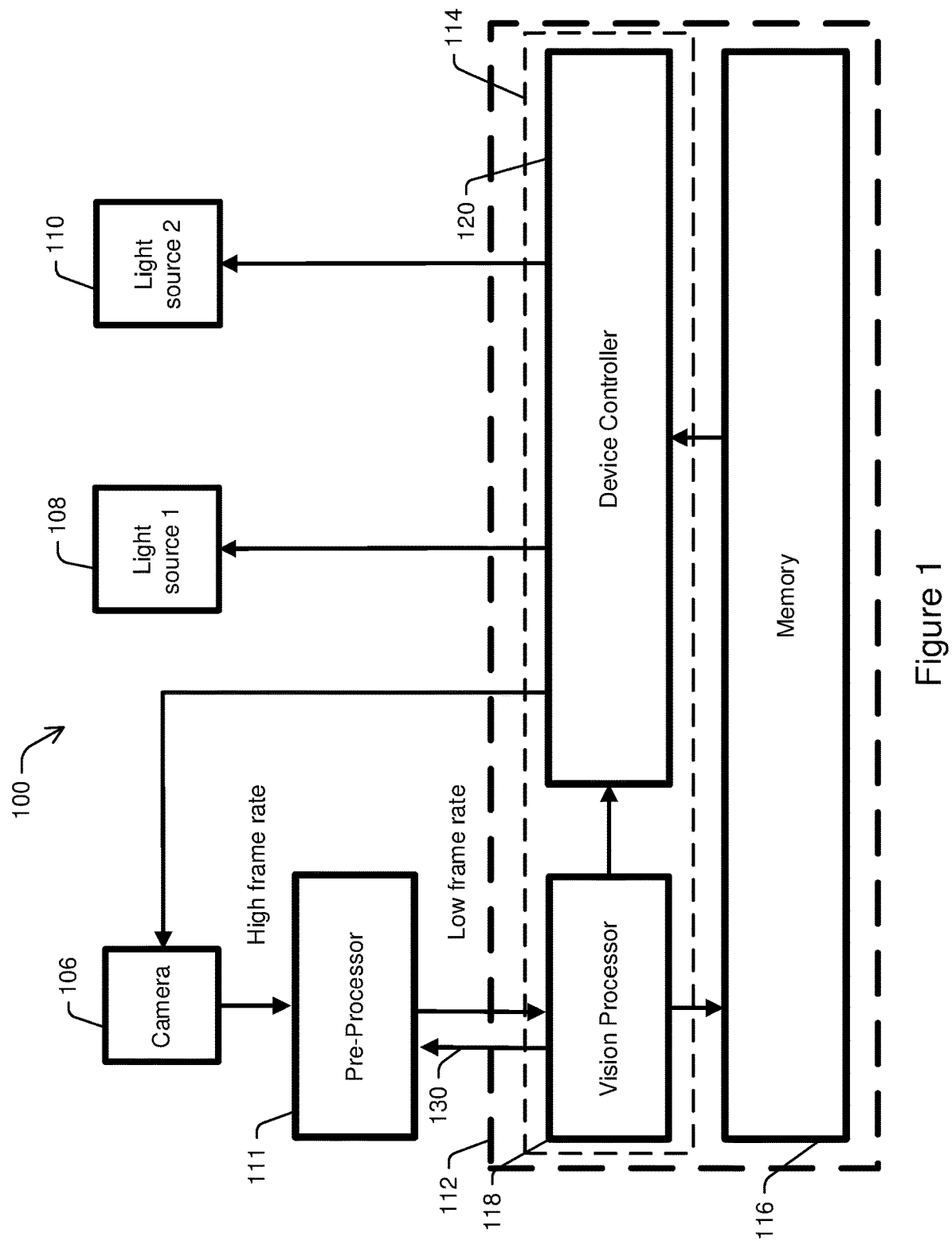
FIG. 1 is a schematic functional view of an image processing system according to an embodiment of the invention, the system including a camera and two LED light sources for illuminating a subject.
Figure 2:
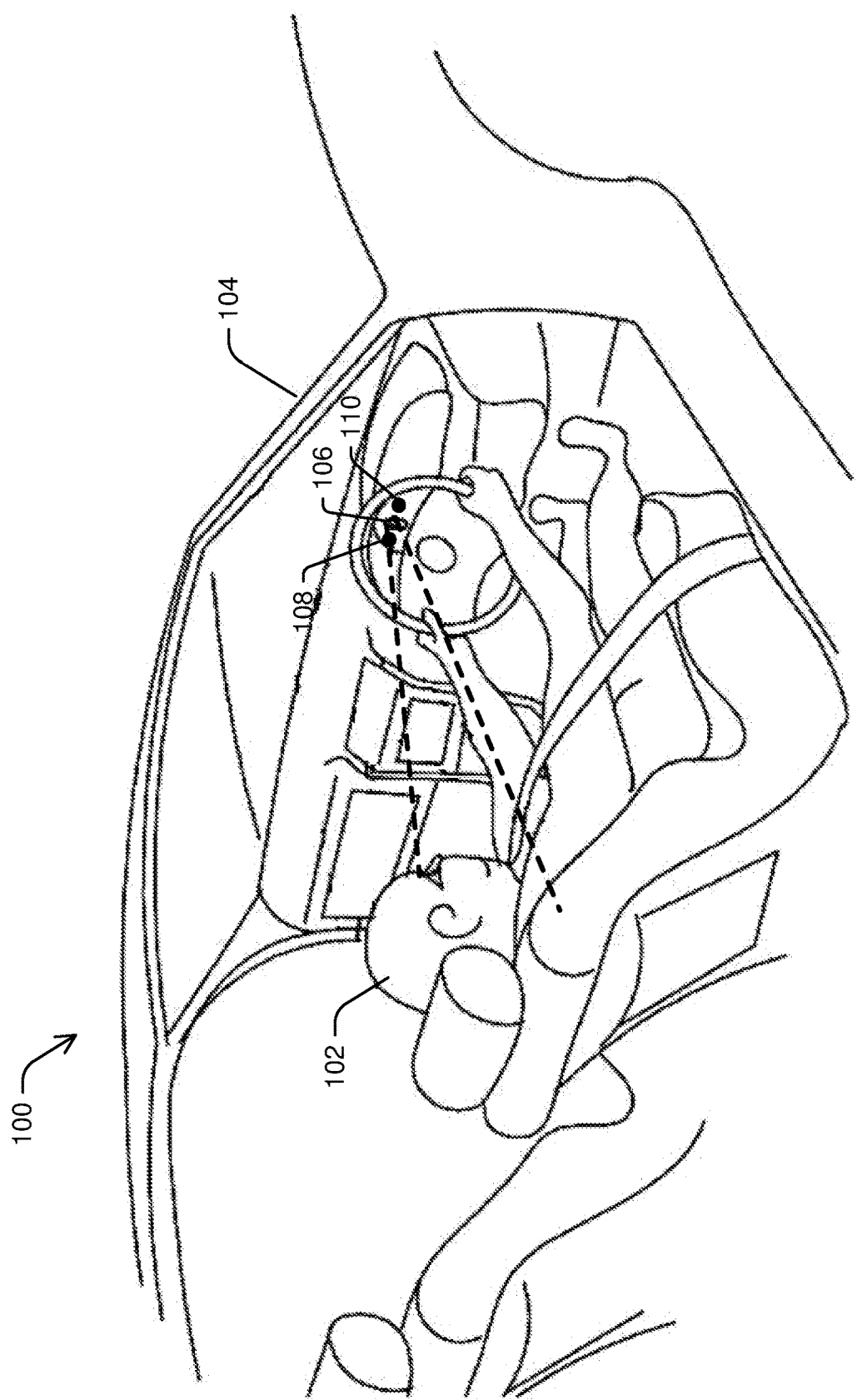
FIG. 2 is a perspective view of the interior of a vehicle having an image processing system according to FIG. 1 which operates as a driver monitoring system.
Figure 3:
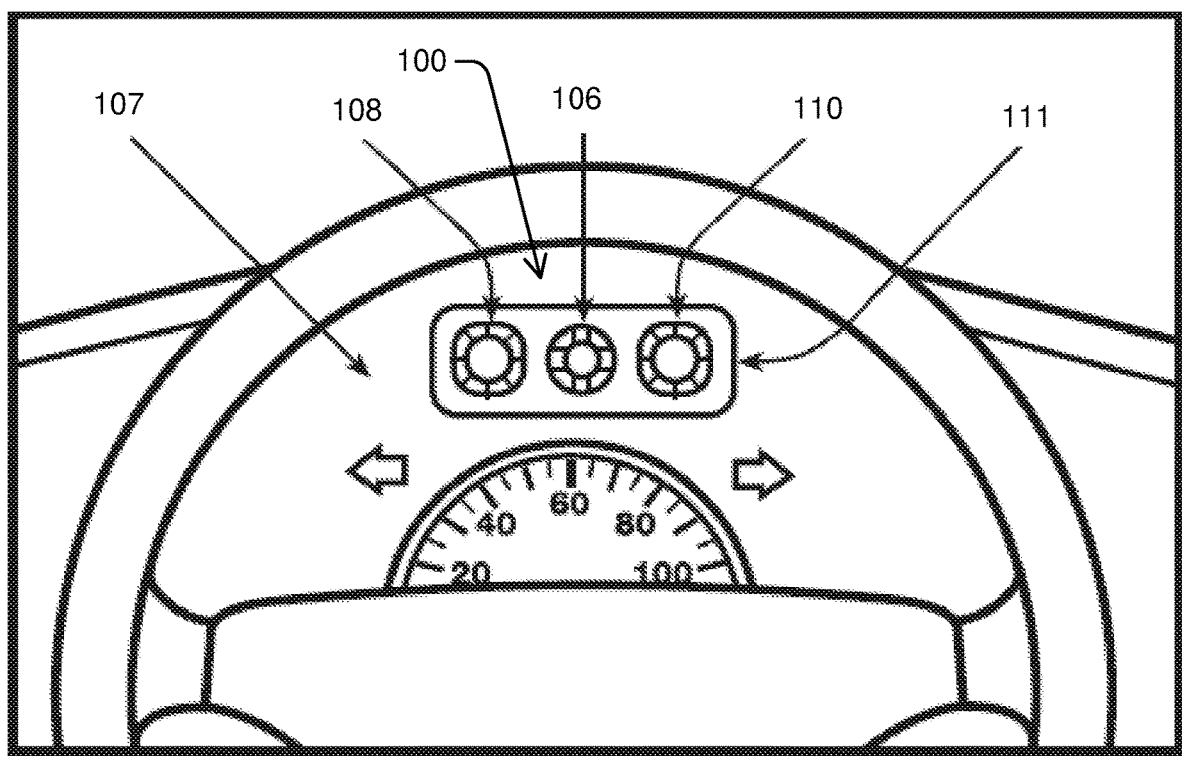
FIG. 3 is an illustration of a driver's perspective view of an automobile dashboard having the driver monitoring system of FIG. 2 installed therein.

Referring initially to FIG. 1, there is illustrated an image processing system 100 according to an embodiment of the invention. As illustrated in FIGS. 2 and 3, system 100 is particularly adapted for operating as a driver monitoring system for monitoring a driver 102 of a vehicle 104 during operation of a vehicle 104. System 100 is further adapted for performing various image processing algorithms on the captured images such as facial detection, facial feature detection, facial recognition, facial feature recognition, facial tracking or facial feature tracking, such as tracking a person's eyes. Example image processing routines are described in U.S. Pat. No. 7,043,056 to Edwards et al. entitled "Facial Image Processing System" and assigned to Seeing Machines Pty Ltd (hereinafter "Edwards et al."), the contents of which are incorporated herein by way of cross-reference.

As best illustrated in FIG. 3, system 100 includes an imaging camera 106 that is positioned on or in the vehicle dash 107 instrument display and oriented to capture images of the driver's face in the infrared wavelength range to identify, locate and track one or more human facial features.

Camera 106 may be a conventional CCD or CMOS based digital camera having a two-dimensional array of photosensitive pixels and optionally the capability to determine range or depth (such as through one or more phase detect elements). The photosensitive pixels are capable of sensing electromagnetic radiation in the infrared range. Camera 106 may also be a three-dimensional camera such as a time-of-flight camera or other scanning or range-based camera capable of imaging a scene in three dimensions. In other embodiments, camera 106 may be replaced by a pair of like cameras operating in a stereo configuration and calibrated to extract depth. Although camera 106 is preferably configured to image in the infrared wavelength range, it will be appreciated that, in alternative embodiments, camera 106 may image in the visible range.

Referring still to FIG. 3, system 100 also includes a pair of infrared light sources in the form of light emitting diodes (LEDs) 108 and 110, horizontally symmetrically disposed at respective positions proximate to the camera on vehicle dash 107. LEDs 108 and 110 are adapted to illuminate driver 102 with infrared radiation, during a time when camera 106 is capturing an image, so as to enhance the driver's face to obtain high quality images of the driver's face or facial features. Operation of camera 106 and LEDs 108 and 110 in the infrared range reduces visual distraction to the driver. LEDs 108, 110 may be operated continuously, intermittently or periodically and may be operated alternatively in a strobed fashion which provides operational advantages in reducing glare present in the images. Operation of camera 106 and LEDs 108, 110 is controlled by an associated controller 112 which comprises a computer processor or microprocessor and memory for storing and buffering the captured images from camera 106. In other embodiments, different types of light sources may be used in place of LEDs.

As illustrated in FIGS. 2 and 3, camera 106 and LEDs 108 and 110 may be manufactured or built as a single unit 111 having a common housing. The unit 111 is shown installed in a vehicle dash 107 and may be fitted during manufacture of the vehicle or installed subsequently as an after-market product. In other driver monitoring embodiments, system 100 may include one or more cameras and light sources mounted in any location suitable to capture images of the head or facial features of a driver, subject and/or passenger in a vehicle. By way of example, cameras and LEDs may be located on a steering column, rearview mirror, center console or driver's side A-pillar of the vehicle. Also, in some embodiments, fewer or more than two light sources may be employed in the system. In the illustrated embodiment, the first and a second light source each include a single LED. In other embodiments, each light source may each include a plurality of individual LEDs.

In the illustrated embodiment, LEDs 108 and 110 are preferably spaced apart horizontally by a distance in the range of about 2 cm to 10 cm and located about 30 cm to 80 cm from the driver's face. The separation of LEDs 108 and 110 is variable provided that the LEDs are located sufficiently off-axis from the camera such that red-eye effects are not present in the captured images. Typically, red-eye effects can be avoided when the LEDs illuminate the driver at angles greater than about 3 degrees from the camera optical axis. However, it will be appreciated that the light sources may be placed at other locations relative to the camera depending on the specific imaging environment and application.

Figure 4:
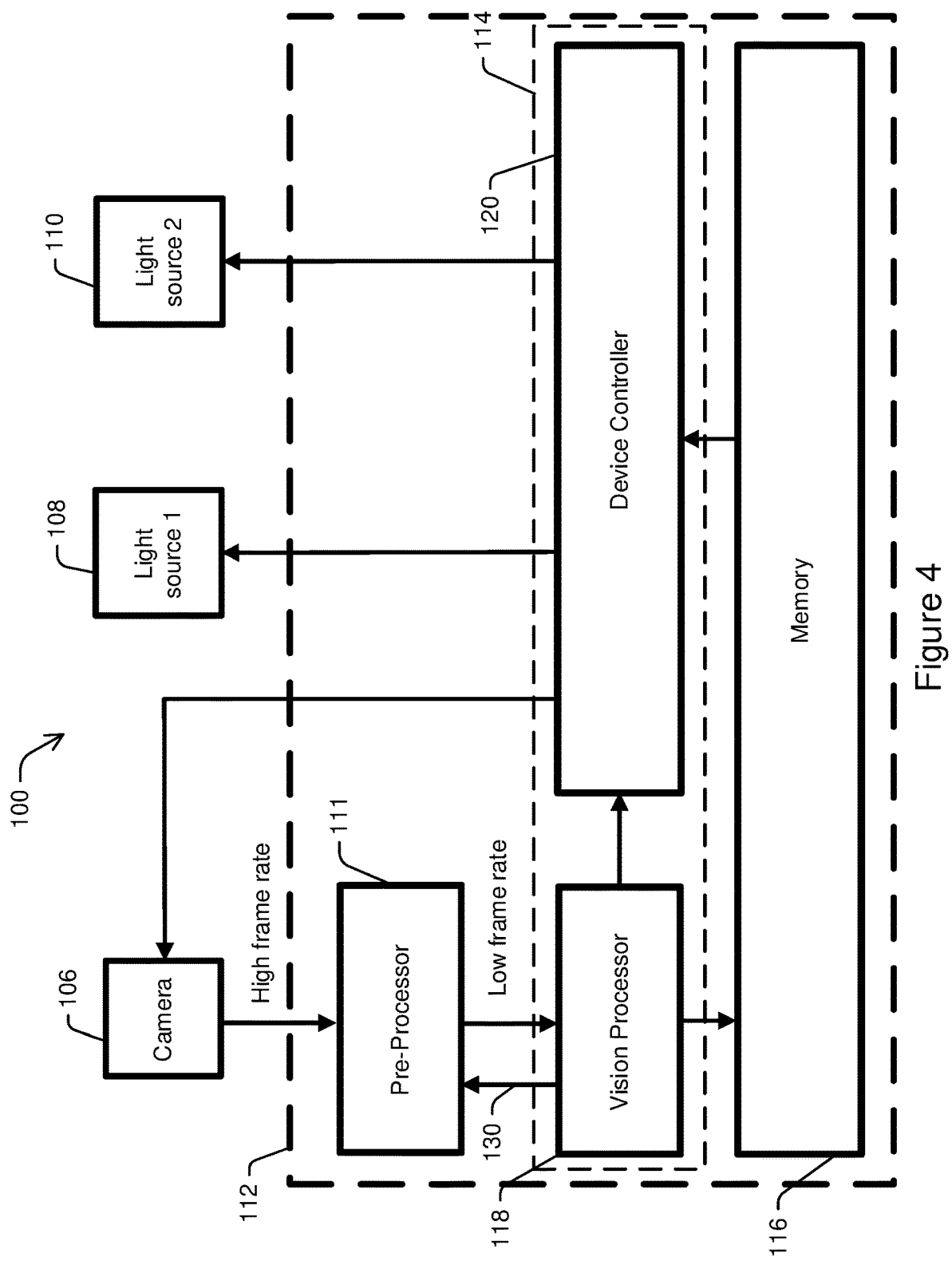
FIG. 4 is a schematic functional view of an image processing system according to an alternative embodiment of the invention in which an image pre-processor is integral with a system controller.

Turning now to FIG. 4, the functional components of system 100 are illustrated schematically.

System 100 includes an image pre-processor 111 module, which is the subject of the present invention and described in detail in the next section below. Pre-processor 111 is co-located with or directly connected to camera 106 and is configured to perform high speed pre-processing of images captured by camera 106 under different illumination conditions (described below). To perform the high-speed image pre-processing, pre-processor 111 preferably includes image processing components which are preconfigured in hardware such as Field programmable Gate Arrays (FPGA) in a system-on-chip arrangement. Example components which are encoded in hardware include image buffers, encoders, decoders, memory and one or more microprocessors configured to perform the pre-processing operations described below. However, it will be appreciated that, in some alternative embodiments, pre-processor 111 may utilize a more generic computer processor configured with software to perform the pre-processing operations.

Pre-processor 111 receives images in a stream from camera 106 at a high frame rate such as 240 Hz and outputs a stream of images at a lower frame rate such as 60 Hz to a system controller 112.

Controller 112 acts as the central processor for system 100 and is configured to perform a number of image processing functions in an image processing pipeline as described below. In the illustrated embodiment, controller 112 is located within the dash 107 of vehicle 104 and co-located or directly connected with pre-processor 111. Controller 112 may be coupled to or integral with the vehicle on-board computer. In another embodiment, controller 112 may be located within a housing or module together with camera 106 and LEDs 108 and 110. The housing or module is able to be sold as an after-market product, mounted to a vehicle dash and subsequently calibrated for use in that vehicle. In further embodiments, such as flight simulators, controller 112 may be an external computer or unit such as a personal computer.

Controller 112 may be implemented as various forms of computer processing device or portion of a device that processes electronic data, e.g., from registers and/or memory to transform that electronic data into other electronic data that, e.g., may be stored in registers and/or memory. As illustrated in FIG. 1, controller 112 includes a microprocessor 114, executing code stored in memory 116, such as random access memory (RAM), read-only memory (ROM), electrically erasable programmable read-only memory (EEPROM), and other equivalent memory or storage systems as should be readily apparent to those skilled in the art.

As controller 112 only processes images at a lower frame rate, the overall data rates are lower and the functions of controller 112 may be implemented through a software controlled microprocessor to reduce cost. Such an implementation also provides for flexibility in the functionality of controller 112 through reprogramming of the software algorithms. In contrast, pre-processor 111 deals with much higher data rates due to the higher frame rate of images and is therefore preferably implemented in hardware components for more efficient image processing.

Microprocessor 114 of controller 112 includes a vision processor 118 and a device controller 120. Vision processor 118 and device controller 120 represent functional elements which are both performed by microprocessor 114 with appropriate software control. However, it will be appreciated that, in alternative embodiments, vision processor 118 and device controller 120 may be realized as separate hardware components such as microprocessors in conjunction with custom or specialized circuitry or FPGA (e.g. system-on-chip).

Vision processor 118 is configured to process the captured images to perform the driver monitoring; for example, to determine a three-dimensional head pose and/or eye gaze position of the driver 102 within the monitoring environment. To achieve this, vision processor 118 utilizes one or more eye gaze determination algorithms. This may include, by way of example, the methodology described in Edwards et al. Vision processor 118 may also perform various other functions including determining attributes of the driver 102 such as eye closure, blink rate and tracking the driver's head motion to detect sleepiness or other issues that may interfere with the driver safely operating the vehicle.

The raw image data, gaze position data and other data obtained by vision processor 118 is stored in memory 116.

Device controller 120 is configured to control camera 106 and to selectively actuate LEDs 108 and 110 in a sequenced manner in sync with the exposure time of camera 106. For example, LED 108 may be controlled to activate during odd image frames and LED 110 is controlled to active during even image frames to perform a strobing sequence. Other illumination sequences may be performed by device controller 120, such as L,L,R,R,L,L,R,R . . . or L,R,0,L,R,0,L, R,0 . . . where "L" represents left mounted LED 108, "R" represents right mounted LED 110 and "0" represents an image frame captured while both LEDs are deactivated. LEDs 108 and 110 are preferably electrically coupled to device controller 120 but may also be controlled wirelessly by controller 120 through wireless communication such as Bluetooth™ or WiFi™ communication.

Thus, during operation of vehicle 104, device controller 120 activates camera 106 to capture images of the face of driver 102 in a video sequence. LEDs 108 and 110 are activated and deactivated in synchronization with consecutive image frames captured by camera 106 to illuminate the driver during image capture. Working in conjunction, device controller 120 and vision processor 118 provide for capturing and processing images of the driver to obtain driver state information such as drowsiness, attention and gaze position during an ordinary operation of vehicle 104.

Additional components of the system may also be included within the common housing of unit 111 or may be provided as separate components according to other additional embodiments. In one embodiment, the operation of controller 112 is performed by an onboard vehicle computer system which is coupled to camera 106 and LEDs 108 and 112.

Although illustrated as being inclusive to the image processing system 100, it will be appreciated that, in other embodiments, different components may be made and sold separately. For example, in some embodiments, camera 106 and light sources 108, 110 may be separate to controller 112 and the image processing system would comprise only pre-processor 111 and components of controller 112. Such embodiments may be practical where a vehicle manufacturer makes the camera and light sources integral with a vehicle dash and a custom controller is later installed to provide the functionality of image processing system 100.

In a further embodiment, illustrated in FIG. 4, pre-processor 113 is integral with controller 112 and all components are configured in hardware and/or software on a single chip or circuit board. In this embodiment, pre-processor 113 may be formed entirely of preconfigured hardware components such as FPGA system-on-chip to execute at higher speeds while the functions of controller 112 may utilise more standard computer processors programmed with specific software algorithms.

Image Pre-Processing

Figure 5:
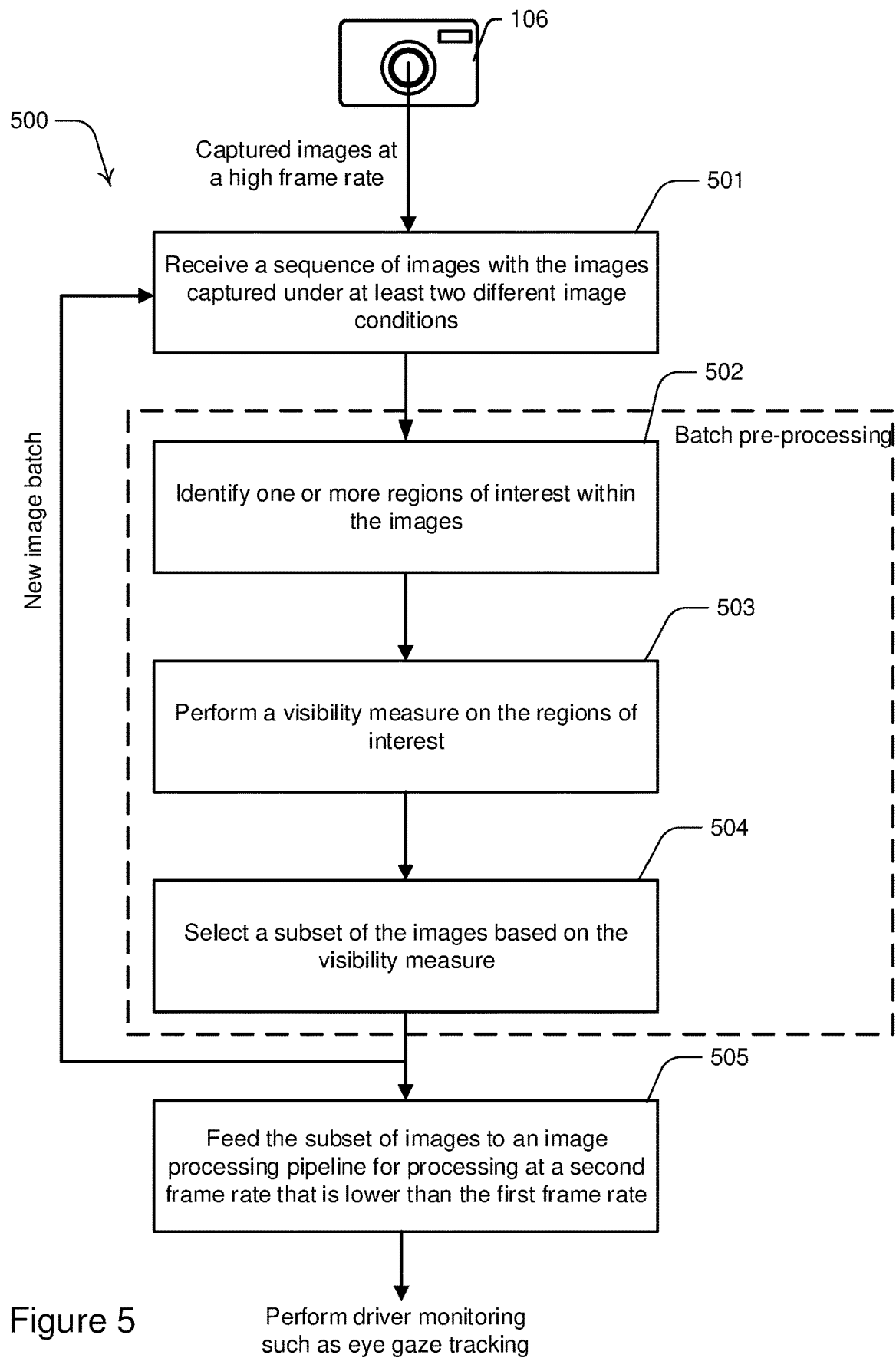
FIG. 5 a process flow diagram illustrating the primary steps in an image pre-processing method according to the invention.

With the system components described above, the operation of pre-processor 111 will now be described in detail with reference to FIG. 5.

Pre-processor 111 is configured to perform an image processing method 500 to pre-process images captured by camera 106 and feed a subset of the images to an image processing pipeline performed by controller 112. At step 501, pre-processor 111 receives a plurality of images captured at a first frame rate from camera 106. The frame rate is chosen to be particularly high such as 240 Hz so as to capture more images for redundancy and to benefit from reduced motion blur when driver 102 (or subject in general) is in motion.

During the capture of the images by camera 106, device controller 120 controls one or both of the camera 106 and LEDs 108 and 110 with control signals to vary the image conditions. Image conditions that can be varied include but are not limited to:

an exposure time of an image by controlling the camera 106 shutter speed, exposure period and/or sensor integration time;

selective illumination by LEDs 108 and 110, such as switching on or off different combinations of the LEDs across different image frames;

a brightness level of the LEDs 108 and 110;

image sensor binning (combining of multiple pixels) to increase or decrease the image resolution;

image sensor cropping to one or more regions of interest within the images; and a focal length of the camera imaging optics used to capture the images.

Figure 6:
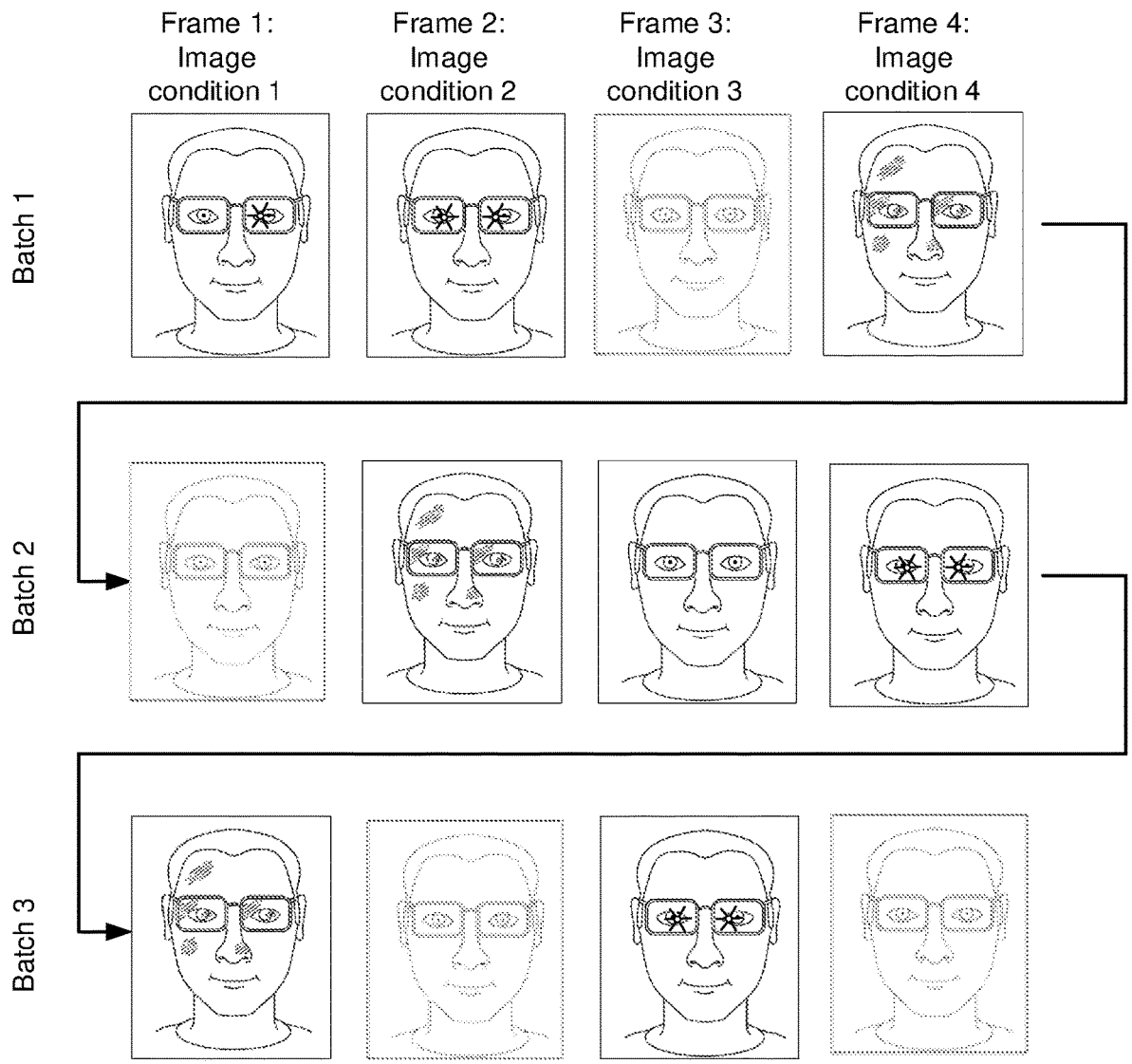
FIG. 6 is a schematic illustration of how an image stream is distributed into batches of four images, with different images captured under different image conditions.

The incoming stream of images from camera 106 is preferably pre-processed by pre-processor 111 in batches. Thus, step 501 may include buffering the images received from camera 106 and distributing them into batches. This is illustrated schematically in FIG. 6, in which a batch size of four images (or any other integer). For each group of images pre-processed, preferably the images have been captured under at least two different image conditions. In a more preferred arrangement, as illustrated in FIG. 6, each image is captured under a different image condition to maximise the possible variation in image quality or feature visibility. By way of example, some images display corneal reflections from different LEDs 108 and 110, shadowing and glare effects and reduced brightness/contrast as they are captured under different imaging conditions.

At step 502, one or more regions of interest within each image is identified. In some embodiments, the identification process is performed manually by a user while in other embodiments, the regions of interest are determined autonomously by vision processor 118 directly or through machine learning processes. The region of interest may include the entire image or one or more subsets of the image pixels.

In some embodiments, step 502 includes identifying an image feature within individual images such as an eye and defining the one or more regions of interest as being a subset of pixels around the identified image feature(s). By way of example, the image features may include a face or facial features such as an eye or pupil of driver 102 (or a subject more generally), or a portion of a vehicle steering wheel in the case where camera 106 is a vehicle dash mounted camera. Various other features may be identifiable depending on the application of the system. The associated region of interest may be defined as a rectilinear or other shaped area of pixels with edges around the identified feature(s) and having dimensions defined by the dimensions of the detected feature(s). In the case where the feature is an occluding feature (such as a portion of a vehicle steering wheel), the region of interest may be defined as an area of pixels which excludes the identified feature.

The feature identification process may be performed in real-time by pre-processor 111 itself or by vision processor 118 through a feedback control signal 130 to pre-processor 111. In the latter case, where the driver monitoring algorithms performed by vision processor 118 involve feature detection, the earlier detection of the locations of those features in the images can be fed back to pre-processor 111 to define the one or more regions of interest.

At step 503, pre-processor 111 executes a process to perform a visibility measure on the one or more regions of interest detected in step 502. The visibility measure can include a variety or measurements relating to the quality, clarity or visibility of an image or features within an image. The visibility measure is preferably a numerical value determined by a predetermined set of rules encoded into pre-processor 111. By way of the example, the visibility measure may be a number between 0 and 1, between 1 and 10 or between 1 and 100. In some embodiments, the visibility measure includes a true/false designation with an associated confidence measure. As described below, the process of step 503 involves measuring characteristics of the images and the measured characteristics may increase or decrease the visibility measure of that image.

In some embodiments, the visibility measure includes executing a specular reflection detection procedure to detect specular reflections within the regions of interest. This procedure may include determining a number and position of specular reflections within the regions of interest and/or identifying or characterising a type of each specular reflections. The characterisation may be able to determine which specular reflections correspond to specular corneal reflections from an eye of driver 102 and/or which specular reflections arise from eyewear being worn by driver 111. In the case of a driver monitoring system, detection of corneal specular reflections acts to increase the visibility measure of the image as it is indicative of the presence of a clear and non-occluded pupil. However, detection of corneal reflections from eyewear acts to reduce the visibility measure of the image as it is indicative of the presence of occluding glare which will often prohibit or reduce the visibility of a pupil.

One exemplary technique for detecting and distinguishing corneal reflections in an image is described in US Patent Application Publication 2016/0210497 A1 entitled "Method and Apparatus for Eye Detection from Glints", and assigned to Seeing Machines Limited. The contents of this disclosure are incorporated herein by way of cross-reference.

In some embodiments, the visibility measure includes executing procedures to:

measure an average or overall brightness level of the regions of interest;
perform edge detection on the one or more regions of interest to determine a shape or size of image features;
performing contrast detection on the one or more regions of interest to determine feature visibility;
detecting an overall level of glare within the one or more regions of interest; and/or
detecting a level of image noise within the one or more regions of interest.

Depending on the particular application and desired outcomes, the visibility measure may include one or many of the above described image characteristics. In some embodiments, the measure of corneal reflections is a primary characteristic to determine an image visibility measure. In these embodiments, the visibility measure may comprise a true/false designation of the presence of corneal reflections, together with an associated confidence measure.

In some embodiments, an assessment of the above image characteristics may be prioritised to determine the visibility measure. The prioritisation may be based on, for example, a detected head orientation of the driver from a previous head tracking loop of the driver monitoring system. Where the head orientation is determined to be angled with respect to the camera, shadowing effects may take a higher priority and so image brightness is prioritised as a characteristic for determining image visibility.

Figure 7:
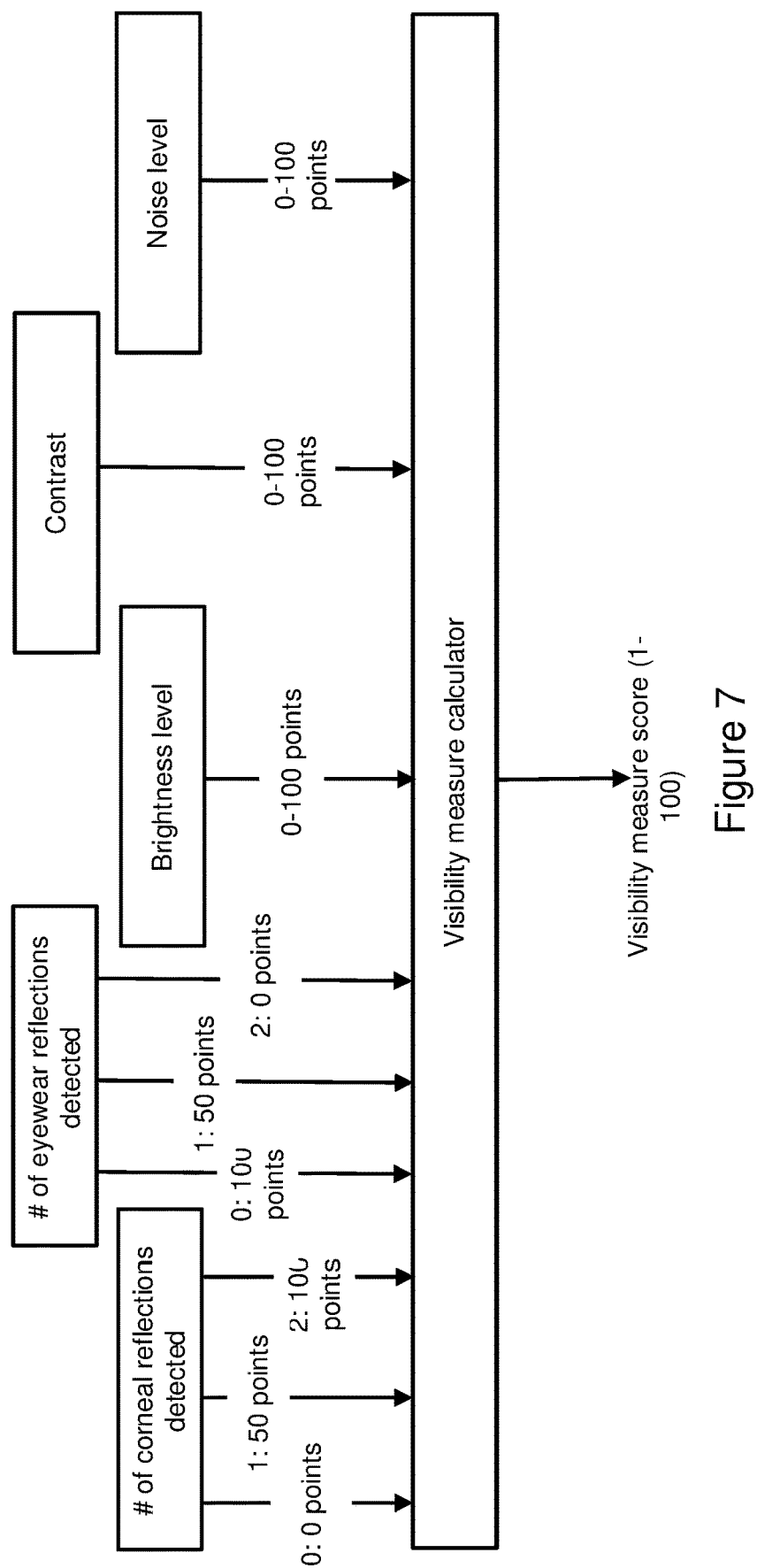
FIG. 7 illustrates a schematic example of a process for calculating a visibility measure score in the image pre-processing method of FIG. 6.

It will be appreciated that step 503 may involve a number of the above described processes and the resulting visibility measure is a combination of values determined from each process. By way of example, FIG. 7 illustrates an exemplary process for calculating a visibility measure score between 1 and 100 from a number of different measured image characteristics. In this example, step 503 involves the execution of a specular reflection detection process to detect the number of corneal and eyewear related specular reflections, a brightness level detection process, a contrast detection process and a noise level detection process. Each process outputs a score based on the individual measures. The presence of detected corneal reflections increases the visibility measure while the presence of detected occluding eyewear reflections decreases the visibility measure. The brightness, contrast and noise level measures all produce a sliding scale measure between 1 and 100. The resulting visibility measure is some aggregate measure of the individual scores. It will be appreciated that various other regimes for assessing image or feature visibility are possible with different image characteristics being given different weights.

Figure 8:
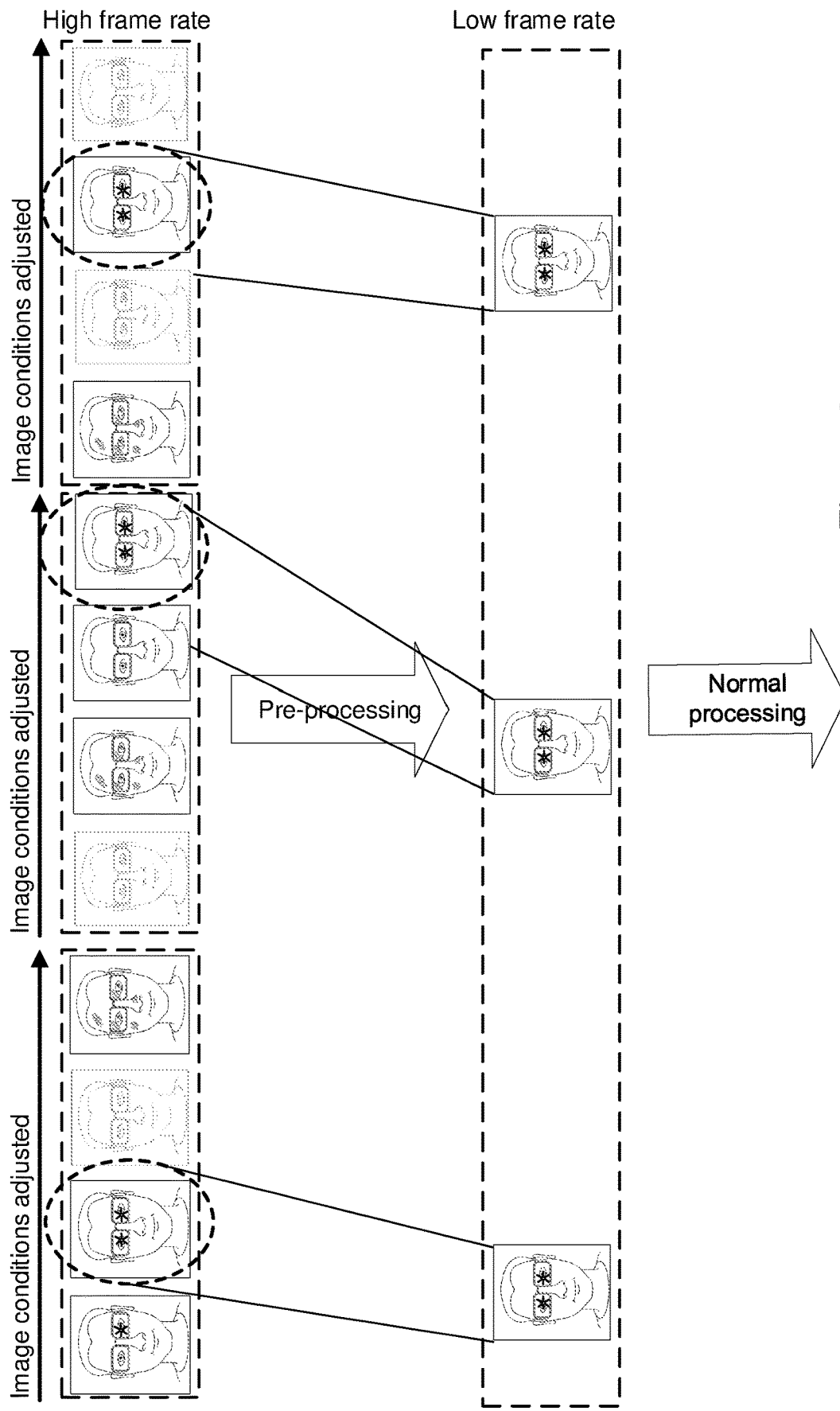
FIG. 8 is a schematic diagram illustrating how the image pre-processing method of FIG. 6 converts a high frame rate image sequence to a lower frame rate image sequence of higher quality images.

At step 504, a subset of the plurality of images is selected based on the visibility measure of step 504. For example, the image in each batch of images processed by pre-processor 111 that is associated with the highest visibility measure in step 503 is selected in step 504. This is illustrated in FIG. 8, which illustrates three batches of four images captured by camera 106. In this illustrated example, one image from each batch is selected at step 504 following the pre-processing steps 501 to 503. However, in other embodiments, it will be appreciated that more than one image may be selected from each batch of images depending on the input and desired output frame rates.

In the example of the visibility measure including a true/false designation of corneal reflections, the selected image may be the image returning a value of true with the highest associated confidence value.

Finally, at step 505, the images selected at step 504 are fed to an image processing pipeline for subsequent processing at a second frame rate that is lower than the first frame rate. This is illustrated in FIG. 8, which illustrates 3 images selected from the 12 initial candidates to produce an output frame rate of 60 Hz (from an input frame rate of 240 Hz). The result is a lower frame rate image sequence of higher quality images. These higher quality images are fed to vision processor 118 as the image processing pipeline to perform various image processing techniques such as the driver monitoring algorithms disclosed in Edwards et al.

Steps 502 to 504 represent the pre-processing steps performed on each image batch. These steps are repeated for each batch of images received from camera 106 in a continuous manner and in real-time.

Although pre-processor 111 has been described as processing batches of four images, it will be appreciated that the number of images in each batch may be any integer, such as 2, 3, 4, 5, 10, 20. The choice of how many images to include in a batch depends on the frame rate of camera 106, the upper limit of the frame rate capable of being processed by the image processing pipeline (vision processor 118), and the desired frame rate to be processed by vision processor 118. In the example described herein, camera 106 captures images at 240 Hz and the images are processed in batches of four. Thus, when one image from each batch is selected in the pre-processing procedure, the output frame rate of the image sequence that is fed to vision processor 118 is 60 Hz.

In some embodiments, the frame rate of images captured by camera 106 is higher than an upper limit of the frame rate capable of being processed by the image processing pipeline (vision processor 118). Due to the reduction in frame rate by pre-processor 111, the processing power requirements of vision processor 118 can be significantly relaxed when compared to the direct processing of high frame rate images from camera 106.

In some embodiments (not illustrated), system 100 is able to operate in different modes such as high frame rate/low processing or low frame rate/high processing depending on predetermined factors. This can be achieved by switching off pre-processor 111 or varying the batch size and/or number of images selected from each batch during the pre-processing procedure.

CONCLUSIONS

In the invention described above, images captured from a high frame video sequence can be processed in a computationally intense manner using a low-cost image processing system. In particular, suitable high visibility and quality images from the high frame rate sequence can be selected from the sequence using a computationally light pre-processing algorithm, preferably codified into hardware on a FPGA chip. These selected images are used to form a lower frame rate video sequence which is fed to a more conventional image processing pipeline to perform less computationally intense image processing such as driver monitoring.

This pre-processing procedure allows the camera to perform fast capture of images while the conventional image processor only processes a lower frame rate based on a subset of the captured images output by the pre-processor. The invention leverages image redundancy so that only the best quality images are selected from a large number of captured images for give period of time. This provides more opportunity to gain clearer images to process. In some embodiments, the system can operate in different modes such as high frame rate/low processing or low frame rate/high processing depending on predetermined factors.

In comparison to HDR techniques, no complex combination or stitching of images is performed at the pre-processing step; only an efficient selection of higher visibility images. This significantly reduces the processing time and allows for the advantages of a high frame rate to be adapted for a lower cost, low frame rate image processing system.

INTERPRETATION

As used herein, the terms 'real-time' refer to the ability of the system to process information within a timeframe such that the next step in the process can be timely performed. By way of example, the above described image pre-processing method is able to be performed iteratively on each batch of images such that the images can be fed to the video processing pipeline in an ongoing basis sufficient to produce continuous output. Applicable response periods for the purpose of defining the constraints of 'real-time' and 'near real-time' are in the range from nanoseconds to several milliseconds.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

I claim:

1. An image pre-processing method including:
   receiving a plurality of images captured at a first frame rate, the plurality of images captured under differing imaging conditions in which a controller periodically and selectively controls one or both of the camera shutter exposure period and/or the illumination time and power of the one or more light sources to obtain the plurality of images captured under differing imaging conditions;
   pre-processing the plurality of images that are captured under differing imaging conditions by:
   (a) identifying one or more regions of interest within each of the images;
   (b) performing a visibility measure which relates to the quality, clarity or visibility of an image or features within the image on the one or more regions of interest; and
   (c) selecting a subset of the plurality of images based on a value of the visibility measure of the one or more regions of interest; and
   feeding the subset of images to an image processing pipeline for subsequent processing at a second frame rate that is lower than the first frame rate.

2. The method according to claim 1 wherein the image conditions include image sensor binning by combining multiple pixels to increase or decrease the image resolution.

3. The method according to claim 1 wherein the image conditions include a focal length of camera imaging optics used to capture the images.

4. The method according to claim 1 wherein the region of interest is the entire image.

5. The method according to claim 1 wherein the step of performing a visibility measure includes detecting specular reflections within the one or more regions of interest.

6. The method according to claim 5 wherein the detecting of specular reflections includes determining a position of specular reflections within the one or more regions of interest.

7. The method according to claim 5 wherein the detecting of specular reflections includes identifying specular corneal reflections from an eye of a subject being imaged.

8. The method according to claim 5 wherein the detecting of specular reflections includes identifying specular reflections from eyewear being worn by a subject being imaged.

9. The method according to claim 5 wherein the step of performing a visibility measure includes determining a number of specular reflections within the one or more regions of interest.

10. The method according to claim 1 wherein the step of performing a visibility measure includes detecting a brightness level of the one or more regions of interest.

11. The method according to claim 1 wherein the step of performing a visibility measure includes performing edge detection and/or contrast detection on the one or more regions of interest.

12. The method according to claim 1 wherein the step of performing a visibility measure includes detecting a level of glare within the one or more regions of interest.

13. The method according to claim 1 wherein the step of performing a visibility measure includes detecting a level of image noise within the one or more regions of interest.

14. The method according to claim 1 wherein the one or more regions of interest includes a face or facial features of a subject being imaged.

15. The method according to claim 1 wherein the first frame rate is higher than an upper limit of the frame rate capable of being processed by the image processing pipeline.

16. The method according to claim 1 wherein the image processing pipeline is a vehicle driver monitoring system.

17. The method according to claim 16 wherein the one or more regions of interest are determined from an earlier detection of the position of a face and/or eyes of the vehicle driver by the driver monitoring system.

18. An image capture and processing system including:
    a camera configured to capture a plurality of digital images of a scene at a first frame rate;
    one or more light sources configured to illuminate the scene during a period in which the digital images are captured;
    a controller configured to periodically selectively control one or both of the camera shutter exposure period and/or the illumination time and power of the one or more light sources to vary imaging conditions under which each digital image is captured to thereby obtain a plurality of images captured under differing imaging conditions;
    a pre-processing system configured to:
    receive the plurality of digital images at the first frame rate and captured under differing imaging conditions;
    pre-process the plurality of digital images that are captured under differing imaging conditions by:
    (a) identifying one or more regions of interest within each of the images;
    (b) performing a visibility measure, which relates to the quality, clarity or visibility of an image or features within the image on the one or more regions of interest; and
    (c) selecting a subset of the plurality of images based on a value of the visibility measure of the one or more regions of interest; and
    feed the subset of the plurality of images to an image processing pipeline at a second frame rate that is lower than the first frame rate.

19. The method according to claim 1 including the step of buffering the received plurality of images and distributing them into batches.

20. An image pre-processing method including:
    capturing a plurality of images at a first frame rate, wherein one or both of a shutter exposure period and/or an illumination time and power of one or more light sources is periodically varied such that the plurality of images are captured under differing imaging conditions;

pre-processing the plurality of images by selecting a subset of the plurality of images based on a measure of visibility of one or more features identified in the images; and feeding the subset of the plurality of images to an image processing pipeline at a second frame rate that is lower than the first frame rate;

wherein the first frame rate is higher than an upper limit of the frame rate capable of being processed by the image processing pipeline.

* * * * *